April 4, 1972 L. A. WILLIAMS 3,654,122
WORKPIECE HOLDING FIXTURE FOR ELECTROLYTIC SHAPING APPARATUS
Original Filed March 15, 1967 3 Sheets-Sheet 1
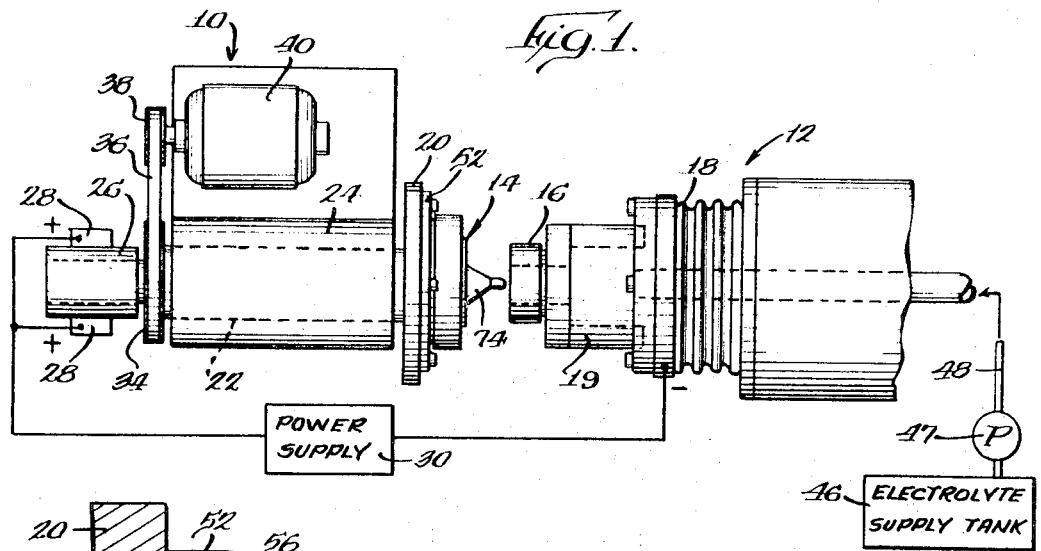
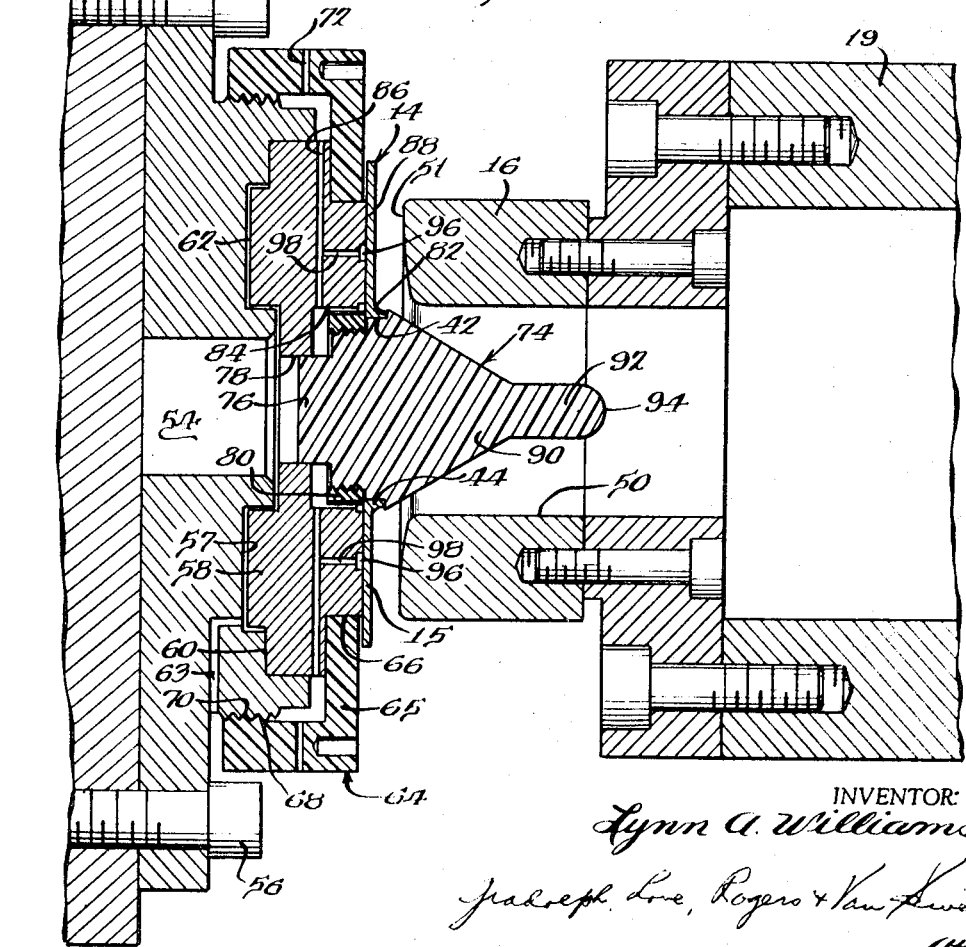
INVENTOR:
Lynn A. Williams

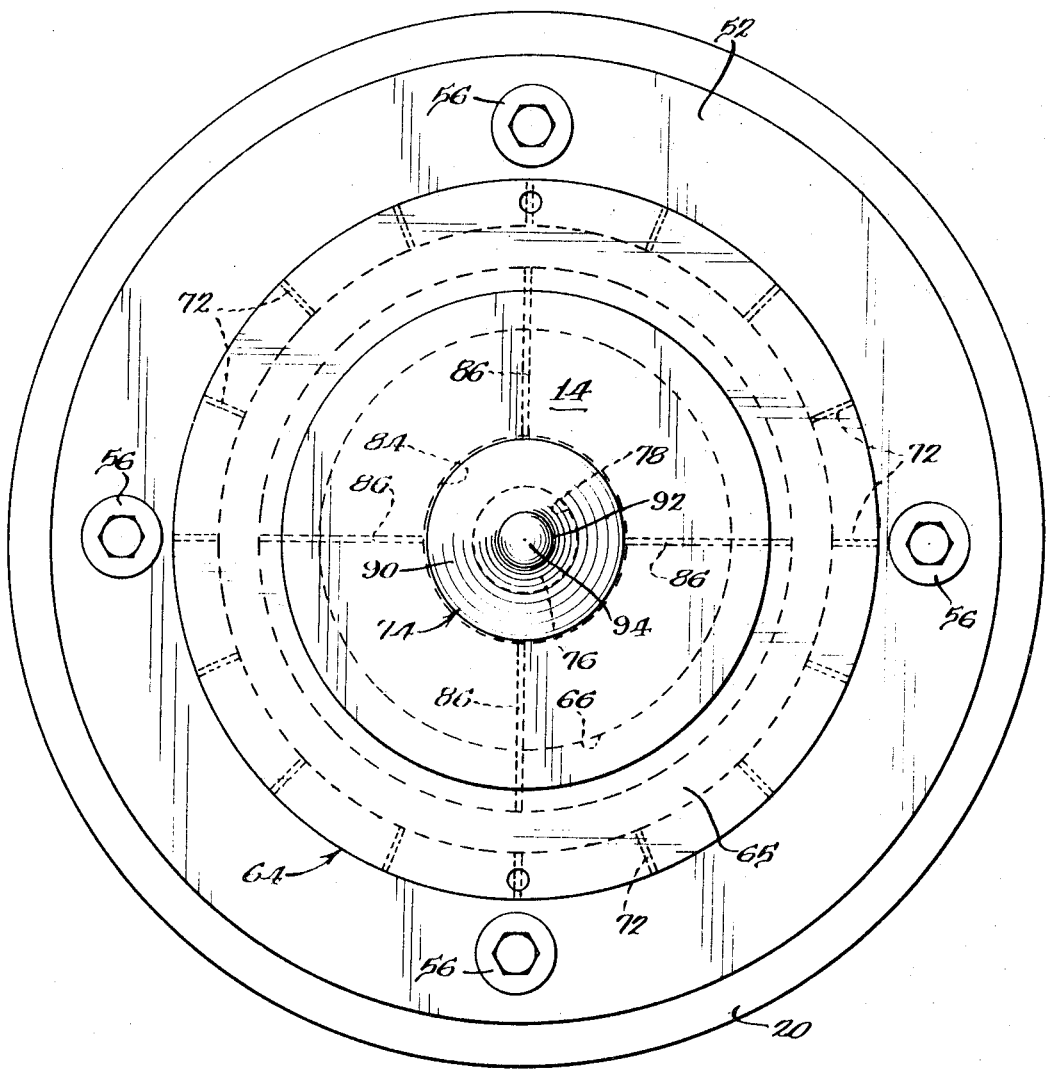

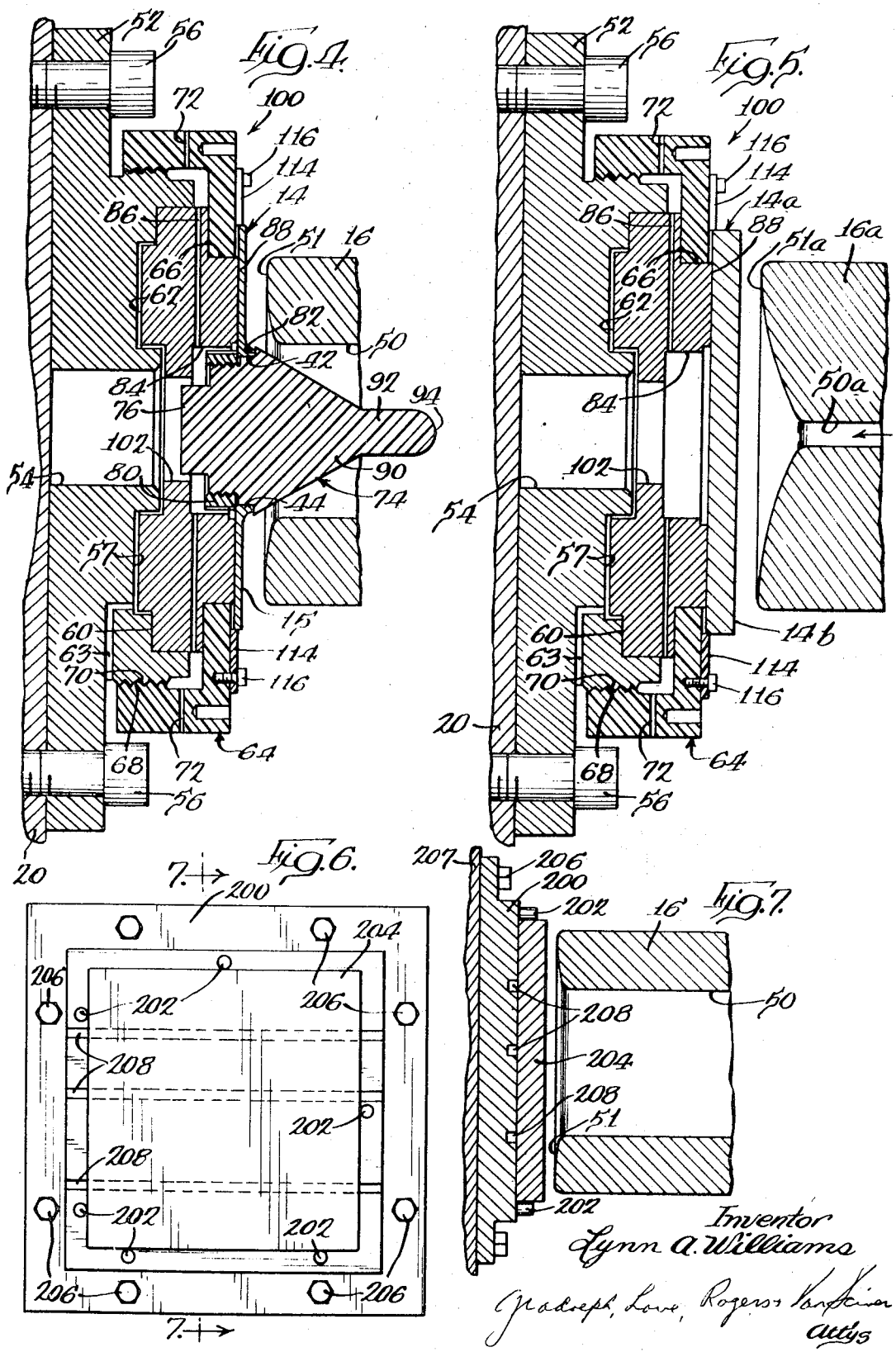

United States Patent Office 3,654,122
Patented Apr. 4, 1972

3,654,122
**WORKPIECE HOLDING FIXTURE FOR ELECTRO-
LYTIC SHAPING APPARATUS**
Lynn A. Williams, Winnetka, Ill., assignor to Anocut
Engineering Company, Elk Grove Village, Ill.
Application Mar. 15, 1967, Ser. No. 633,650, which is a
Continuation-in-part of application Ser. No. 228,401,
Oct. 4, 1962. Divided and this application June 27,
1969, Ser. No. 837,234
Int. Cl. C23b 5/70
U.S. Cl. 204—297
9 Claims

ABSTRACT OF THE DISCLOSURE

Apparatus for electrolytically machining a workpiece by means of an electrically conductive electrode where the electrolyte is pumped under substantial pressure through the electrode and between the working face of the electrode and the surface being electrolytically machined on a workpiece held in a fixture which provides a support for the back of the workpiece held thereagainst by the pressure of the electrolyte and has ports and passages to drain away any electrolyte tending to accumulate between the workpiece and the workpiece support; the fixture provides electrical contact for the positive side of the current supply to the workpiece, and it is fitted with means to hold the workpiece in position, such as a central pilot member for annular workpieces, and periphery supports for all shapes of workpieces including ammeter workpieces. The fixture may be rotated, if desired.

CROSS-REFERENCES TO RELATED PATENTS

This application is a division of application Ser. No. 633,650, filed Mar. 15, 1967 now abandoned, which is a continuation-in-part of co-pending application Ser. No. 228,401, filed Oct. 4, 1962 now abandoned, entitled Workpiece Holding Fixture. Reference should also be had to Lynn A. Williams application Ser. No. 772,960, filed Nov. 10, 1958, and issued into Pat. No. 3,058,895, dated Oct. 16, 1962, and application Ser. No. 73,154, filed Sept. 2, 1960, and issued into Pat. No. 3,275,543, dated Sept. 27, 1966, and Lynn A. Williams and Leonard Malkowski application Ser. No. 201,679, filed June 11, 1962, and issued into Pat. No. 3,287,246, dated Nov. 22, 1966.

SUMMARY OF THE INVENTION

It has been discovered that contours in and cavities in and through electrically conductive and electrochemically erodible workpieces can be formed by a hollow electrode having an electrolyte flowing therethrough under appreciable pressure and with a low potential, high density direct current passed simultaneously between the electrode and workpiece. This method and the apparatus for practicing it are described in the above mentioned patents of Lynn A. Williams.

More recently, it has been discovered that annular grooves, notches, or other annular shaping may be effected by an electrolytic lathe wherein a workpiece is rotated as the electrode performs electrolytic shaping upon the workpiece. Such as electrolytic lathe is disclosed in the above mentioned Patent No. 3,287,246.

In electrolytic shaping and cavity sinking, it is extremely important that the workpiece be held in such manner that it will not unintendedly move during the electrolytic shaping operation. In lathes and other machines for performing machining operations, the workpiece is held by chuck jaws, clamps, dogs, and the like to be accessible to the machine tool for whatever operation is to be performed. Heretofore similar devices have been used in accurately and securely fixturing the workpieces for electrolytic shaping or machining.

It has been found that for most electrolytic machining operations that a sodium chloride electrolyte incorporating smaller amounts of sodium or potassium nitrate is extremely effective and very economical. Such electrolytes, as well as others used, are corrosive of materials commonly used for the fixturing of chucks, clamps, dogs, and the like, and it is necessary that the latter be made of stainless steel or some other material that will not corrode. If the noncorroding material is a metal and the fixturing elements touch the workpiece, they will pick up a positive charge, and over a period of time there will be an anodic attack on these elements due to leakage of current through splatter or flow of electrolyte.

Almost any clamping device, unless it is very elaborate, tends to put clamping pressures at a relatively few localized points. Where the workpieces are heavy in section, this is not objectionable. Where, however, the workpiece is or becomes, during electrolytic shaping operation, very thin in section, then the holding pressures, when concentrated on a few small areas, may distort the piece.

For these kinds of reasons, there is a special importance in the elimination of moving devices in and around the workpiece for the purpose of clamping it. The problem presented heretofore and overcome by the present invention has been serious and costly.

Additionally, it is advantageous that the workpiece be held in such manner that it may be easily and quickly inserted into and removed from the electrolytic shaping apparatus. To this end the present invention contemplates removably securing the workpiece to a portion of the fixturing device while outside the apparatus and during the shaping operation on another identical part. At end of the electrolytic operation, the shaped part is removed and another substituted. In this manner a large number of parts or workpieces may be electrolytically shaped without costly delay in inserting them in and removing them from the apparatus. Nonproductive apparatus time is thus kept to a minimum.

The workpiece fixturing devices of this invention utilize the pressure of the electrolyte to and through the work gap between the workpiece and the working face of the electrode in holding the workpiece in electrolytic machining position.

It is a principal object of the present invention to provide a new and improved fixture having the foregoing discussed advantages for holding workpieces during electrolytic shaping or machining.

It is a further object of the present invention to provide a new and improved fixture for holding workpieces being electrolytically shaped in an electrolytic lathe.

It is a further object of the present invention to provide a fixture for electrolytic shaping operations wherein the workpiece may be easily and quickly inserted into and removed from the machine.

It is a still further object of the present invention to provide a fixture for holding a workpiece during electrolytic shaping, wherein the workpiece is held in fixtured position by the pressure of the electrolyte employed in the electrolytic shaping apparatus.

The invention, both as to its organization and method of operation, together with further objects and advantages thereof, will best be understood by reference to the following description taken in conjunction with the accompanying drawings.

BRIEF DESCRIPTION OF THE DRAWINGS

FIG. 1 is a diagrammatic representation of an electrolytic lathe empolying a fixture embodying the features of the present invention;

FIG. 2 is a cross sectional view on an enlarged scale of the fixture and a portion of the electrode illustrated in FIG. 1;

FIG. 3 is a face view of the fixture of FIG. 2;

FIG. 4 is a cross sectional view, similar to FIG. 2, of a modified fixture embodying the features of the present invention;

FIG. 5 is a cross sectional view of the fixture of FIG. 4, showing its use in the electrolytic shaping of a disc-shaped workpiece;

FIG. 6 is a face view of another fixture embodying the features of the present invention; and FIG. 7 is a cross sectional view, taken along the line 7—7 of FIG. 6, looking in the direction of the arrows.

DESCRIPTION OF THE PREFERRED EMBODIMENT

Referring to the drawings, and more particularly to FIG. 1 to 3, there is illustrated an electrolytic lathe of the type disclosed in the above mentioned Williams and Malkowski Pat. No. 3,287,246. The electrolytic lathe includes a workholder assembly 10 and a drivehead assembly 12. The workholder assembly 10 is adapted to rotate a workpiece 14 in a work area. The drive head assembly 12 controls and effects the axial movement of an electrode 16 as it performs an electrolytic shaping operation upon the workpiece 14. The work area is enclosed by any suitable housing of stainless steel, as more fully described in the above mentioned Lynn A. Williams Pat. No. 3,275,543.

The drive head assembly 12 is mounted upon a suitable base (not shown) and includes an axially movable ram assembly 18 including an electrolyte manifold 19 which projects into the working area. The drive head assembly 12, is for the most part, enclosed within a housing (not shown) made of sheet metal. The drive head assembly 12 need not be discussed herein as it is fully described and illustrated in the Williams and Malkowski patent referred to hereinabove, and does not constitute a part of the present invention.

Basically, the workholder assembly 10 is adapted to support and rotate the workpiece 14 with respect to the electrode 16 and also assures that the workpitce 14 has a positive potential relative to the electrode 16. To these ends, the workholder assembly 10, which is described and illustrated in detail in the Williams and Malkowski patent, includes a workholder plate 20 mounted on the forward end of a copper spindle 22 which is rotatably mounted within a guide block 24 in ball bearings (not shown). The guide block 24 is mounted upon a suitable platform and may be insulated therefrom or grounded, as desired. The spindle 22 carries a collector ring or sleeve 26 contacted by electrical brushes 28 connected to the positive terminal of a power supply 30 and suitably mounted on and insulated from the machine frame or housing. The negative terminal of the power supply 30 is connected through the ram plate 18 and manifold 19 to the electrode 16.

The workpiece 14 is secured to the workholder plate 20 by a fixture 32 embodying the features of the present invention.

The spindle 22, the workholder plate 20, the fixture 32 and the workpiece 14 are rotatably driven through a pulley 34 mounted on the spindle 22. The pulley 34 is driven by a belt 36 which is, in turn, driven by a pulley 38 on a motor 40. By changing the pulley 38 on the motor 40, various rotational speeds may be imparted to the spindle 22 and the workpiece 14, thereby rotating the workpiece 14 at the desired speed. Ordinarily a speed of about 100 to 200 r.p.m. is employed.

During the operation of the electrolytic lathe, the workpiece 14 is placed in the fixture 32, in a manner more apparent hereinafter, and the workholder 20 is rotated by actuating the motor 40. While the workpiece 14 is rotating, the ram assembly 18 is driven by a motor (not shown) to bring the electrode 16 rapidly into working position and then to move the electrode 16 at a constant feed rate through the electrolytic shaping operation. Electrolyte from a suitable source, including a tank 46 and pump 47, is pumped at a pressure of 30 or 40 to 350 p.s.i. through a line 48 and through the drivehead assembly 12 to enter the manfold 19 which communicates with a central passageway 50 of the electrode 16. The electrolyte is pumped between working face 51 of the electrode 16 and the workpiece 14 and radially outwardly into the work area, where it is recovered by suitable means (not shown) and returned to the tank 46.

By virtue of the current and the electrolyte pumped between the electrode 16 and the workpiece 14, electrolytic shaping upon the workpiece 14 is effected, as will be understood from the previously mentioned patents. It will be understood that with this arrangement, annular forms of many kinds may be cut in the workpiece.

Referring primarily to FIGS. 2 and 3, the fixture 32 embodying the features of the present invention will be described in detail. The fixture 32 holds and positions the workpiece 14 with respect to the electrode 16. In this instance, the workpiece 14 is an annular ring having a hole 42 through an axially extending hub 44 at its center. In this instance it is desired to make an annular groove on one side of the workpiece 14 to reduce the thickness of web 15 to about .006″ to .007″.

The fixture 32 comprises an annular fixture base 52 having a central hole 54. The fixture base is made of electrically conductive material, such as copper and the like, and is secured to the work holder plate 20 by suitable means such as bolts 56. The base 52 is formed with an annular recess 57 into which a complementally shaped brass bearing plate 58 is fitted. It will be seen from FIG. 2 that the recess 57 in the base 52 and rear face of the plate 58 are contacted along an annulus 60 adjacent the outer rear face of the plate 58 to provide a conductive path between the base 52 and the plate 58. The other rear surfaces of the plate 58 and the forward surfaces of the recess 57 are slightly spaced at 62 to provide an exit path for any electrolyte which may enter the fixture and the central hole 54. The space 62 is drained through radial passages 63 in the base 52. The plate 58 is retained in its FIG. 2 position by an annular nut 64 having a securing flange 65 engaged in an annular peripheral recess 66 in the forward face of the plate 58 and held by complemental threads 68 and 70 on the plate 58 and nut 64, respectively. The nut 64 is made of an electrically nonconductive and electrochemically inert material such as glass fiber-epoxy laminate and is provided with radial holes 72 to accommodate the escape of electrolyte trapped between the workpiece 14 and its holder.

The workpiece 14 is held by a central pilot member 74, also preferably made of a glass fiber-epoxy laminate, which is formed with a piloting and centering plug portion 76 at its rear side projecting through the hole 42 in the workpiece 14 and fitting snugly in a central hole 76 in the plate 58. It should be noted from FIG. 2 that the piloting and centering portion 76 is smaller than the workpiece hole 42 and may be slightly flatted at two, three, or more places around its periphery to facilitate the placement of the plug portion 76 in the plate opening 78.

The workpiece 14 is secured to the pilot member 74 by a ring nut 80 threaded onto an externally tapped portion of the member 74 to hold the hub 44 against a rearwardly facing shoulder 82 on the member adjacent the tapped section. It will be noted from FIG. 2 that the ring nut 80 fits within an enlarged counterbore 84 of the bored 78 in the plate 58 and that radial holes 86 communicate the counterbore with the interior of the clamping ring 62 and the radial openings 72 to facilitate the escape of any entrapped electrolyte.

The workpiece 14 is secured to central pilot member 74 outside of the electrolytic machining apparatus, and it is contemplated that several such members 74 should be provided for each fixture 32 so that while one workpiece 14 is being electrolytically shaped, at least one other will be secured to a central pilot member. Thus, at the end of the electrolytic operation the electrode 16 is rapidly removed from the shaped workpiece 14, the latter and its supporting pilot member 74 are removed from the fixture 32, another workpiece and its supporting pilot member 74 are placed in the fixture, the electrode 16 is rapidly moved to shaping position, and the electrolytic machining operation is immediately resumed. It is clear that tihs arrangement provides (1) for preliminary partial fixturing of the workpiece outside the machine and while electrolytic machining is being performed on another workpiece, (2) for easy and quick replacement of a machined workpiece with an unmachined one, and (3) for minimum nonproductive, i.e., nonmachining, time of the electrolytic apparatus.

During operation the electrolyte is pumped through and from the passage 50 in the electrode 16 and radially outwardly against the web 15 of the workpiece 14. The electrolyte being pumped at a substantial pressure, acts directly on the central pilot member 74 and the portion of the workpiece 14 exposed in the bore of the electrode, and creates a pressure in the work gap between the workpiece and the working face 51 of the electrode to force the workpiece 14 firmly against an annular face 88 on the brass plate 58. Assuming an electrolyte pressure in the order of 30 or 40 to 350 p.s.i., the pressure on the workpiece 14 is much greater than that which might be obtained by a vacuum type fixture arrangement where the maximum holding force is about 15 p.s.i. In this manner the pressurized electrolyte maintains the workpiece 14 in the fixture 32 during the electrolytic shaping and insures good contact between the workpiece 14 and the fixture plate 58 to make a good connection for the workpiece into the positive side of the electric current supply.

FIG. 2 shows that the central pilot member 74 has a conical forward portion 90 terminating in a cylindrical portion 92 with a rounded head 94 projecting into the bore 50 of the electrode 16. This particular shape on that portion of the central pilot member 74 insures that there is an even distribution of the electrolyte radially through the work gap between the workpiece 14 and the working face 51 of the electrode 16. If the shape of the central pilot member 74 causes sharp discontinuities in the electrolyte flow at the point of entry into the work gap, this may cause roughness and striations on the electrolytically machined surface. This would, of course, be quite pronounced in situations where the workpiece is not rotated. Consequently, the shape of the central pilot member 74 exposed directly to electrolyte pressure is important and should be carefully selected, although that shown will be found suitable for most situations.

This shape, furthermore, provides a convenient finger grip by means of which the central pilot member 74 and the attached workpiece 14 are inserted into and removed from the machine.

For workpieces having a thin section on which the electrolyte shaping operation is to be performed, it might be thought that the Bernoulli effect of the flowing electrolyte would pull the web 15 away from the surface 88. However, it will be noticed from FIG. 2 that the electrode working surface 51 is deepest at its outer edge and shallowest at the entry to the work gap. (This shape is somewhat exaggerated in the drawings.) It is possible that this avoids the Bernoulli effect; another theory for such avoidance is explained in the following paragraph.

It has been found from tests that when electrolyte is pumped through the bore of the electrode and through the narrow work gap between the surface of the workpiece to be eroded and the working face of the electrode, that the pressure of the electrolyte momentarily present in the work gap is zero nearly so. However, as soon as the electrolyzing current is turned on, this pressure rises rapidly, and while it may not reach the electrolyte pressure at the inlet to the electrode, it is very substantial and is adequate to hold the workpiece web 15 against the face 88. It is theorized that the gaseous by-product of electrolysis is responsible for this pressure, but whatever the cause, the pressure is present and may be utilized to hold the workpiece 14 against the surface 88. Consequently, it is desirable that the electrolytic machining operation proceed as follows: (1) rapidly advance the electrode 16 so that its working face 51 is about 0.15" from the workpiece 14; (2) turn on the electrolyte pump 47 so that the electrolyte is pumped through the electrode and the work gap; and (3) simultaneously energize the electrolyzing current and the controls and means for effecting advance of the electrode 16 toward the workpiece at a constant rate.

It is an important aspect of the fixture 32 that back pressure tending to force the workpiece 14 out of the fixture 32 is eliminated. Such back pressure may be created by electrolyte leaking into the holes 54 and 78 and between the web 15 and the surface 88 whereby the central pilot member 74 and the workpiece 14, respectively, would be forced outwardly of the fixture 32. This would cause the workpiece 14 to flutter and, additionally, break the electrical contact between the surface 88 and workpiece web 15. The latter would interrupt the electrolytic shaping process and metal removal would be stopped or at least substantially reduced. Under certain circumstances this flutter might even cause a shorting contact between the workpiece and the electrode, which could damage both.

To prevent the development of this type of back pressure the fixture 32 has the previously described radially extending passageways 63, 72 and 86 and space 62 through which electrolyte which has worked its way behind the workpiece and to the bores 84 and 54 may automatically exit. If necessary, the surface 88 may have an annular groove 96 therein communicating by passages 98 with the radially extending passageways 86 to facilitate removal of electrolyte from between the surface 88 and the workpiece 14. This is an optional construction and in many if not most instances it is not used. Its use is not indicated where the workpiece is extremely thin, and in the order of a few thousandths of an inch. The lack of direct electrical connection in the area of the annular groove 96 will cause a slightly lower electrical potential to exist in the workpiece directly opposite the groove so that less material will be removed in this area. The error thus involved may be small, but for some kinds of parts it may be prohibitive.

Referring to FIG. 4, there is disclosed a modified fixture indicated generally by reference numeral 100. Those elements of the electrolytic lathe described hereinbefore and of the fixture 32 included in this fixture are designated by like reference numerals. The fixture 100, as the fixture 32, is particularly adapted to hold the workpiece 14.

The fixture 100 includes the fixture base 52 described hereinbefore and the brass support plate 58 mounted in the recess 57. Central opening 102 in the plate 58 is larger than the plug portion 76 of the central pilot member 74 and does not, therefore, center the workpiece 14 in the fixture 100.

Lateral movement of the workpieces 14 is, in this instance, prevented by a plurality of members 114 made of suitable plastic resistant to attack from the electrolyte and secured to the ring nut 64 by bolts 116 or the like. It will be understood that the tips of the lateral guide members 114 have a sliding engagement with the outer edge of the workpiece 14 so that the latter may be easily removed by hand from the fixture 100 and, on the other hand, easily placed into the fixture 100 in the position shown in FIG. 4.

In this instance, as in the embodiment described in FIGS. 1 to 3, the workpiece 14 is maintained against the locating face 88 by virtue of the hydrostatic pressure exerted by the electrolyte pumped through the electrode 16 and radially outwardly between the web 15 of the workpiece 14 and the working face 51 of the electrode. The central pilot member 76 prevents the electrolyte from passing into the bores 54, 74 and 84, but if any should enter thereinto, it may escape through the space 62 and the passages 63, 86 and 72.

FIG. 5 illustrates another use of the fixture of FIG. 4 wherein the workpiece 14a is shown as a comparatively thick disc having a surface 14b which is to be electrolytically machined. The workpiece is held in proper relationship with the electrode 16a by the peripheral elements or fingers 114. In this embodiment no centering pilot member or plug 74 is used, and the workpiece 14a is held against the face 88 of the brass support plate by the pressure of the electrolyte flowing through electrode passage 50a and between working face 51a of the electrode 16a and the surface 14b of the workpiece. As previously indicated, the pressure is preferably within the range of 30 or 40 to 350 p.s.i. The arrangement illustrated in FIG. 5 permits the making of non-symmetrical shapes in the workpiece, and in this instance the fixture would not be rotated, and also permits the machining of non-circular and imperforate workpieces. If desired and found necessary, the fixture could be formed with the groove 96 in the surface 88 and the connecting passageways 98.

Referring to FIGS. 6 and 7, there is shown another embodiment of the present invention wherein a fixture plate 200 has a plurality of outwardly extending pins 202 which provide lateral positioning for, in this instance, a square workpiece 204. The fixture plate 200 is secured to the workholder plate 20 by bolts 206 or the like. It should be understood that in this instance the workpiece is intended not to be rotated. The workpiece 204 is placed between the pins 202 which prevent lateral movement of the workpiece 204. A pair of pins 202 is on two adjacent sides of the workpiece 204 while single pins 202 are at the other two sides of the workpiece 204 as shown in FIG. 6. In this instance, as the electrode 16 proceeds toward the workpiece 204, the pressure of the electrolyte against the workpiece 204 prevents the workpiece 204 from moving away from the fixture plate 200. Thus, in this embodiment, the pins 202 prevent lateral movement of the workpiece 204 and the pressure of the electrolyte maintains the work against the fixture plate 200. Parallel grooves 208 in the face of the fixture place 200 facilitate the escape of any electrolyte trapped behind the workpiece 204 and insures that good electrical contact is made between the workpiece 204 and the fixture plate 200.

FIGS. 1 through 5 illustrate fixtures which are usable where the workpiece may be or is rotated, while that of FIGS. 6 and 7 is intended to be used where the workpiece is not rotated. It is to be understood that the fixtures of FIGS. 1 through 5 need not be rotated and nonsymmetrical and discontinuous shapes may be electrolytically machined as well as the annular and disc shapes described. Furthermore, by placing the pins 202 in a circular arrangement about an axis of rotation and preferably making the fixture plate 200 circular, the fixture of FIGS. 6 and 7 may be rotated with no difficulty.

It will be understood that different types of electrodes may be employed in the operations described herein. For example, electrodes useful in electrode turning may comprise a circular plate made of plastic with an insert copper sector embracing perhaps a 15 to 30° arc. The copper sector will have in it the contour which is desired in the workpiece. On one or both sides of the pie-shaped sector there will be slots for feeding electrolyte extending back through the plastic in such a way that the electrolyte will be fed through these slots from the electrolyte manifold. Some of the electrolyte solution will find its way back over the plastic and will escape without doing any useful work. Some of it, however, will flow out across the pie-shaped copper element and provide a suitable flow of electrolyte to conduct current between the cooper element and the workpiece for material removal. It is intended that the term "electrode," as used in the claims, embraces a structure of this type as well as the tubular-type electrode illustrated.

In addition, it will be understood that alternating current type of electrolytic shaping, with a rotating workpiece, such as disclosed in the application of Lynn A. Williams, Ser. No. 222,319, filed Sept. 10, 1962, entitled "Multi-Phase Electrolytic Removal Apparatus," issued as Pat. No. 3,214,361 dated Oct. 26, 1965, may also be employed with the fixture of the present invention.

While the embodiments described herein are at present considered to be preferred, it will be understood that various modifications and improvements may be made therein, and it is intended to cover in the appended claims all such modifications and improvements as fall within the true spirit and scope of the invention.

What is claimed as new and desired to be secured by Letters Patent of the United States is:

1. A fixture for holding a workpiece opposite an electrode during electrolytic shaping by the cooperative action of the electrode, means for supplying electrolyte under pressure, means to direct said electrolyte against the workpiece and means for passing an electrolyzing current between the electrode and the workpiece, comprising in combination, an electrically conductive workholder plate having a surface against which the workpiece is adapted to be held and adapted to be connected to the means for passing an electrolyzing current between the electrode and the workpiece, electrically nonconductive and electrochemically inert means engageable with the workpiece and cooperating with said plate to prevent lateral movement of the workpiece during the electrolytic shaping, said inert means also permitting perpendicular movement of the workpiece to provide ready removal thereof, said means to direct electrolyte under pressure against the workpiece holding the latter in electrical contact with said plate surface, whereby said surface supplies electrolyzing current to the workpiece, and relief passage means provided in said workholder plate to afford reduction of electrolyte pressure behind the plate to assist in maintaining said electrical contact.

2. The combination set forth in claim 1, wherein said fixture structure has a central opening therein, and said fixture structure includes an electrically nonconductive and electrochemically inert center pilot member adapted to be secured to the workpiece and removably engaging in said central opening.

3. The combination set forth in claim 2, wherein said center pilot member has a plug portion slidably engaging in said central opening.

4. The combination set forth in claim 2, wherein the workpiece is annular in configuration, and said center pilot member has a portion extending through the workpiece opening and a plug portion whereby the workpiece is clamped by said center pilot member, and said slug portion slidably engages in said structure central opening.

5. The combination set forth in claim 2, wherein the electrode is hollow, and said center pilot member has a conical portion adapted to project into the electrode when the latter is in shaping position, and said means to direct electrolyte under pressure against the workpiece includes the electrode and said conical portion.

6. The combination set forth in claim 2, wherein said relief passage means include a plurality of radially extending relief passages extending outwardly from said central opening through said fixture structure, an annular groove in said plate surface, and a plurality of passages in said fixture structure communicating with said groove and extending to the exterior of said fixture.

7. The combination set forth in claim 1, wherein said means to prevent lateral movement of the workpiece comprises a plurality of pins extending outwardly from said plate and engaging the edges of the workpiece.

8. The combination set forth in claim 7, wherein said pins are fixed to said plate and define a zone conforming to the configuration of the workpiece and into which the workpiece is adapted to be placed during electrolytic shaping.

9. The combination set forth in claim 7, wherein said plate surface has one or more grooves therein to remove electrolyte from between said surface and the workpiece.

References Cited

UNITED STATES PATENTS

| | | | |
|---|---|---|---|
| 1,534,918 | 4/1925 | Claybourn | 204—297 R |
| 2,051,965 | 8/1936 | Roth | 287—53 |
| 2,401,415 | 6/1946 | Duggan | 204—297 R |
| 2,511,416 | 6/1950 | Rundorff | 279—89 |
| 2,675,348 | 4/1954 | Greenspan | 204—297 R |
| 3,287,246 | 11/1966 | Williams et al. | 204—224 |
| 3,288,698 | 11/1966 | Bruns | 204—224 |

JOHN H. MACK, Primary Examiner

R. J. FAY, Assistant Examiner

U.S. Cl. X.R.

204—143 M, 212, 224